US011400537B2

(12) United States Patent
Ivkovich

(10) Patent No.: US 11,400,537 B2
(45) Date of Patent: Aug. 2, 2022

(54) SYSTEM AND METHODS FOR LABELING WELD MONITORING TIME PERIODS USING MACHINE LEARNING TECHNIQUES

(71) Applicant: ILLINOIS TOOL WORKS INC., Glenview, IL (US)

(72) Inventor: Stephen P. Ivkovich, East Lansing, MI (US)

(73) Assignee: Illinois Tool Works Inc., Glenview, IL (US)

( * ) Notice: Subject to any disclaimer, the term of this patent is extended or adjusted under 35 U.S.C. 154(b) by 29 days.

(21) Appl. No.: 16/983,302

(22) Filed: Aug. 3, 2020

(65) Prior Publication Data

US 2021/0078093 A1 Mar. 18, 2021

Related U.S. Application Data

(60) Provisional application No. 62/899,293, filed on Sep. 12, 2019.

(51) Int. Cl.
 B23K 9/095 (2006.01)
(52) U.S. Cl.
 CPC .......... B23K 9/0953 (2013.01); B23K 9/0956 (2013.01)
(58) Field of Classification Search
 CPC ..... B23K 9/0953; B23K 9/0956; G06N 20/00
 See application file for complete search history.

(56) References Cited

U.S. PATENT DOCUMENTS

| | | |
|---|---|---|
| 4,375,026 A | 2/1983 | Kearney |
| 5,221,825 A | 6/1993 | Siewert et al. |
| (Continued) | | |

FOREIGN PATENT DOCUMENTS

| | | |
|---|---|---|
| CA | 2356304 | 2/2001 |
| CN | 101329169 | 12/2008 |
| (Continued) | | |

OTHER PUBLICATIONS

P. Sassi, P. Tripicchio and C. A. Avizzano, "A Smart Monitoring System for Automatic Welding Defect Detection," in IEEE Transactions on Industrial Electronics, vol. 66, No. 12, pp. 9641-9650, Dec. 2019, doi: 10.1109/TIE.2019.2896165. (Year: 2019).*
PCT, Notification of Transmittal of the International Search Report and the Written Opinion of the International Searching Authority, or the Declaration, in Application No. PCT/US2016/051585, dated Dec. 21, 2016 (12 pages).
PCT, Notification of Transmittal of the International Search Report and the Written Opinion of the International Searching Authority, or the Declaration, in International application No. PCT/US2016/051579, dated Jan. 10, 2017 (12 pages).
(Continued)

*Primary Examiner* — Robert J Utama
(74) *Attorney, Agent, or Firm* — McAndrews, Held & Malloy, Ltd.

(57) ABSTRACT

Systems and methods for labeling non-welding time periods using machine learning techniques are described. In some examples, a weld monitoring system may collect various data from sensors and/or welding equipment in a welding area over a time period. The data may evaluated to divide the time period into welding time periods and non-welding time periods. The weld monitoring system may use one or more machine learning models and/or techniques in combination with the collected data to determine what non-welding activities took place during the non-welding time periods. In some examples, the machine learning models may be continuously trained, updated, and/or improved using feedback from operators and/or other individuals, data from ongoing welding and/or non-welding activities, as well as data from other weld monitoring systems and/or machine learning models.

20 Claims, 6 Drawing Sheets

(56) References Cited

U.S. PATENT DOCUMENTS

| | | | |
|---|---|---|---|
| 5,714,734 A | 2/1998 | Peterson et al. | |
| 5,756,967 A | 5/1998 | Quinn et al. | |
| 6,362,456 B1 | 3/2002 | Ludewig | |
| 6,484,584 B2 | 11/2002 | Johnson et al. | |
| 6,583,386 B1 | 6/2003 | Ivkovich | |
| 6,624,388 B1 | 9/2003 | Blankenship et al. | |
| 6,636,776 B1 | 10/2003 | Barton et al. | |
| 6,795,778 B2 | 9/2004 | Dodge et al. | |
| 6,815,640 B1 | 11/2004 | Spear et al. | |
| 7,159,753 B2 | 1/2007 | Subrahmanyam | |
| 7,375,304 B2 | 5/2008 | Kainec et al. | |
| 7,574,172 B2 | 8/2009 | Clark et al. | |
| 7,643,890 B1 | 1/2010 | Hillen et al. | |
| 7,687,741 B2 | 3/2010 | Kainec et al. | |
| 7,772,524 B2 | 8/2010 | Hillen et al. | |
| 7,873,495 B2 | 1/2011 | Lindell | |
| 8,224,881 B1 | 7/2012 | Spear et al. | |
| 8,274,013 B2 | 9/2012 | Wallace | |
| 8,354,614 B2 | 1/2013 | Ma et al. | |
| 8,592,723 B2 | 11/2013 | Davidson et al. | |
| 8,657,605 B2 | 2/2014 | Wallace et al. | |
| 8,847,115 B2 | 9/2014 | Casner et al. | |
| 9,193,004 B2 | 11/2015 | Enyedy et al. | |
| 9,266,182 B2 | 2/2016 | Hung et al. | |
| 9,321,133 B2 | 4/2016 | Fischer et al. | |
| 9,415,514 B2 | 8/2016 | Geheb et al. | |
| 9,449,498 B2 | 9/2016 | Dina et al. | |
| 9,481,045 B2 | 11/2016 | Spear | |
| 9,498,839 B2 | 11/2016 | Hillen et al. | |
| 9,665,093 B2 | 5/2017 | Lamers et al. | |
| 9,669,484 B2 | 6/2017 | Verson et al. | |
| 9,684,303 B2 | 6/2017 | Lamers et al. | |
| 9,704,140 B2 | 7/2017 | Lamers et al. | |
| 9,724,787 B2 | 8/2017 | Becker et al. | |
| 9,773,429 B2 | 9/2017 | Boulware et al. | |
| 9,821,400 B2 | 11/2017 | Hillen et al. | |
| 9,836,994 B2 | 12/2017 | Dig et al. | |
| 9,862,048 B2 | 1/2018 | Verson et al. | |
| 9,862,049 B2 | 1/2018 | Becker | |
| 9,889,517 B2 | 2/2018 | Lambert et al. | |
| 9,937,577 B2 | 4/2018 | Daniel et al. | |
| 9,937,578 B2 | 4/2018 | Becker et al. | |
| 9,965,973 B2 | 5/2018 | Peters et al. | |
| 9,975,196 B2 | 5/2018 | Zhang et al. | |
| 9,993,890 B2 | 6/2018 | Denis et al. | |
| 10,010,959 B2 | 7/2018 | Daniel | |
| 10,012,962 B2 | 7/2018 | Lamers et al. | |
| 10,032,388 B2 | 7/2018 | Sommers et al. | |
| 10,144,080 B2 | 12/2018 | Chantry et al. | |
| 10,204,406 B2 | 2/2019 | Becker et al. | |
| 10,213,862 B2 | 2/2019 | Holverson et al. | |
| 10,242,317 B2 | 3/2019 | Barhorst et al. | |
| 2006/0169682 A1 | 8/2006 | Kainec et al. | |
| 2008/0124968 A1 | 5/2008 | Kirk et al. | |
| 2009/0173726 A1 | 7/2009 | Davidson et al. | |
| 2010/0152554 A1 | 6/2010 | Steine et al. | |
| 2012/0248081 A1 | 10/2012 | Hutchison | |
| 2013/0075380 A1 | 3/2013 | Albrech et al. | |
| 2013/0178953 A1 | 7/2013 | Wersborg et al. | |
| 2013/0189658 A1 | 7/2013 | Peters et al. | |
| 2013/0212512 A1 | 8/2013 | Frenz | |
| 2014/0021184 A1* | 1/2014 | Daniel | B65H 67/02 219/136 |
| 2014/0047107 A1 | 2/2014 | Maturana et al. | |
| 2014/0131320 A1 | 5/2014 | Hearn et al. | |
| 2014/0282893 A1* | 9/2014 | Sheller | H04L 63/08 726/4 |
| 2014/0332514 A1 | 11/2014 | Holverson et al. | |
| 2014/0337429 A1 | 11/2014 | Asenjo et al. | |
| 2015/0069112 A1 | 3/2015 | Abou-Nasr et al. | |
| 2016/0171633 A1* | 6/2016 | DeWalt | G06Q 10/063114 705/7.15 |
| 2017/0032281 A1* | 2/2017 | Hsu | G06N 7/005 |
| 2017/0072496 A1 | 3/2017 | Falde et al. | |
| 2017/0072497 A1 | 3/2017 | Ivkovich | |
| 2017/0185058 A1 | 6/2017 | Holverson et al. | |
| 2018/0032066 A1 | 2/2018 | Enyedy et al. | |
| 2018/0178320 A1 | 6/2018 | Webster | |
| 2019/0019061 A1 | 1/2019 | Trenholm et al. | |
| 2019/0022787 A1 | 1/2019 | Daniel | |
| 2019/0084069 A1 | 3/2019 | Daniel et al. | |
| 2019/0138786 A1* | 5/2019 | Trenholm | G06T 7/50 |
| 2019/0160601 A1 | 5/2019 | Daniel | |
| 2019/0163172 A1 | 5/2019 | Daniel et al. | |

FOREIGN PATENT DOCUMENTS

| | | |
|---|---|---|
| CN | 102528227 | 7/2012 |
| CN | 102596476 | 7/2012 |
| CN | 102922089 A | 2/2013 |
| CN | 103331506 | 10/2013 |
| CN | 103862135 | 6/2014 |
| CN | 103909325 | 7/2014 |
| CN | 104379291 | 2/2015 |
| CN | 104551372 | 4/2015 |
| CN | 104768694 | 7/2015 |
| CN | 107154950 | 9/2017 |
| DE | 102009016798 A1 | 10/2010 |
| WO | 2012000650 | 1/2012 |
| WO | 2013160745 | 10/2013 |
| WO | 2014149786 A1 | 9/2014 |

OTHER PUBLICATIONS

Canadian Office Action Appln No. 2,996,182 dated Nov. 5, 2019 (5 pages).

The welding system of the future is self-learning, Mar. 20, 2015, retrieved Apr. 7, 2015 from http://phys.org/news/2015-03-welding-future-self-learning.html (2 pages).

Gundersen, O., et al., The Use of an Integrated Multiple Neural Network Structure for Simultaneous Prediction of Weld Shape, Mechanical Properties, and Distortion in 6063-T6 and 6082-T6 Aluminium Assemblies (62 pages).

Huot, Pierre, The Basics of Weld and Process Monitoring, Quality Magazine, Apr. 9, 2015 (4 pages).

Porter, Nancy C., Session 5, Joining Technologies for Naval Applications, Fabtech International & AWS Welding Show, Nov. 13-16, 2015 (32 pages).

Zaharia, Matei, et al., Resilient Distributed Datasets: A Fault-Tolerant Abstraction for In-Memory Cluster Computing, Electrical Engineering and Computer Sciences, University of California at Berkeley, Technical Report No. UCB/EECS-2011-82, http://www.eecs.berkeley.edu/Pubs/TechRpts/2011/EECS-2011-82.html, Jul. 19, 2011 (14 pages).

Bao, Yuan et al: "Massive sensor data management framework in Cloud manufacturing based on Hadoop", Industrial Informatics (INDIN), 2012 10th IEEE International Conference on, IEEE, Jul. 25, 2012, pp. 397-401, XP032235317, DOI: 10.1109/1 NDI N.2012. 6301192 ISBN: 978-1-4673-0312-5 (5 pages).

Lu, Huang et al: "Research on Hadoop Cloud Computing Model and its Applications", Networking and Distributed Computing (ICNDC), 2012 Third International Conference on, IEEE, Oct. 21, 2012, pp. 59-63, XP032293322, DOI: 10.1 109/I CN DC.2012.22 ISBN: 978-1-4673-2858-6 (5 pages).

International Search Report and Written Opinion, dated Oct. 14, 2016, in International application No. PCT/US2016/044463, filed Jul. 28, 2016 (14 pages).

European Patent Office, Extended Search Report, European Patent Application No. 20161414.6, dated Aug. 5, 2020, 7 pages.

European Patent Office, Extended Search Report, European Patent Application No. 20176044.4, dated Dec. 17, 2020, 9 pages.

European Patent Office, Extended European Search Report, European Patent Application No. 20192803.3, dated Mar. 10, 2021, 7 pages.

Yuan Bao, et al., "Massive Sensor Data Management Framework in Cloud Manufacturing Based on Hadoop", IEEE, Jul. 25, 2012, pp. 397-401 (Y type reference).

(56) References Cited

OTHER PUBLICATIONS

European Patent Office, Office Action, No. 20192803.3, dated Feb. 11, 2022.

* cited by examiner

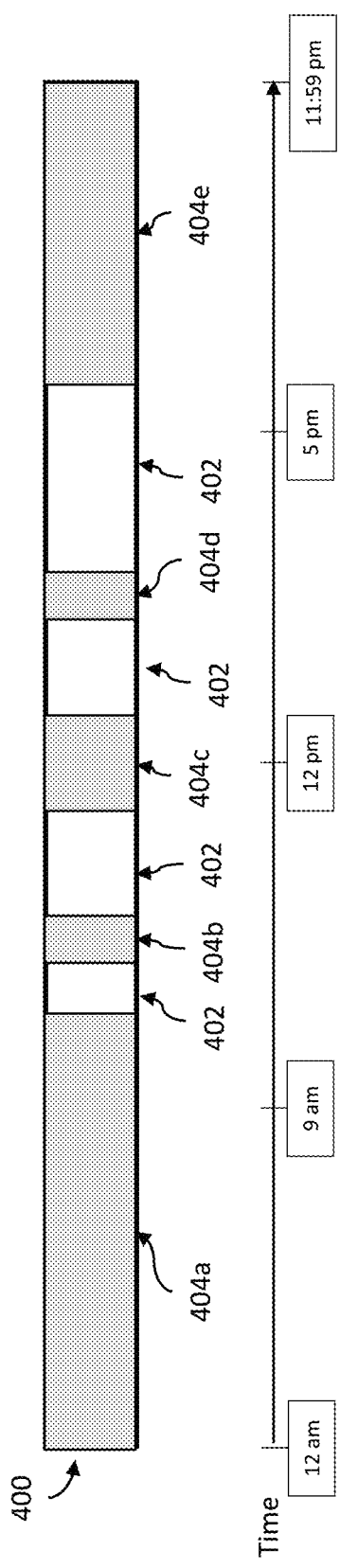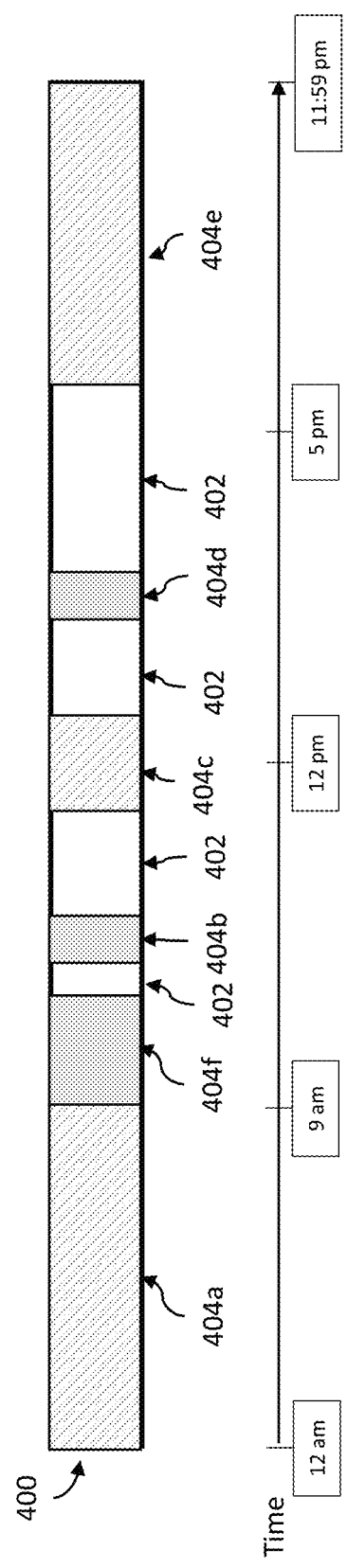

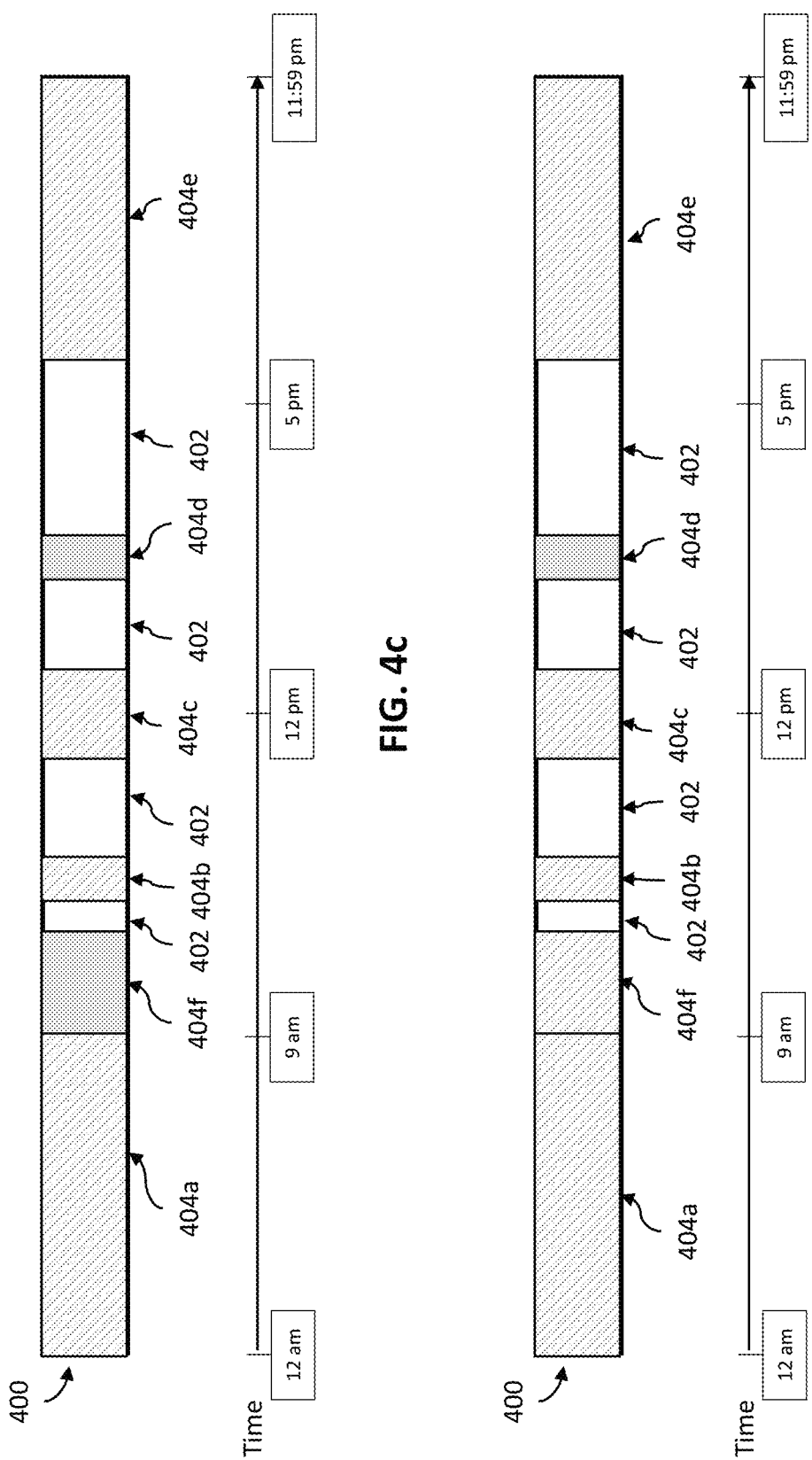

US 11,400,537 B2

SYSTEM AND METHODS FOR LABELING WELD MONITORING TIME PERIODS USING MACHINE LEARNING TECHNIQUES

CROSS REFERENCE TO RELATED APPLICATIONS

This application claims priority to, and the benefit of, U.S. Provisional Application No. 62/899,293, titled "Systems and Methods for Labeling Weld Monitoring Time Periods Using Machine Learning Techniques, filed Sep. 12, 2019, the entirety of which is hereby incorporated by reference.

TECHNICAL FIELD

The present disclosure generally relates to weld monitoring systems and, more particularly, to systems and methods for labeling weld monitoring time periods using machine learning techniques.

BACKGROUND

Weld monitoring systems monitor data pertaining to welding operations and related activities. Conventional weld monitoring systems rely upon welding operator input to understand what is happening when there is no welding taking place. Lack of operator input can result in ineffective monitoring.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for labeling weld monitoring time periods using machine learning techniques, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIGS. 4a-4d illustrate an example labeling of a twenty-four hour time period using the activity identification program of FIGS. 3a-3b, in accordance with aspects of this disclosure.

Figure 1:
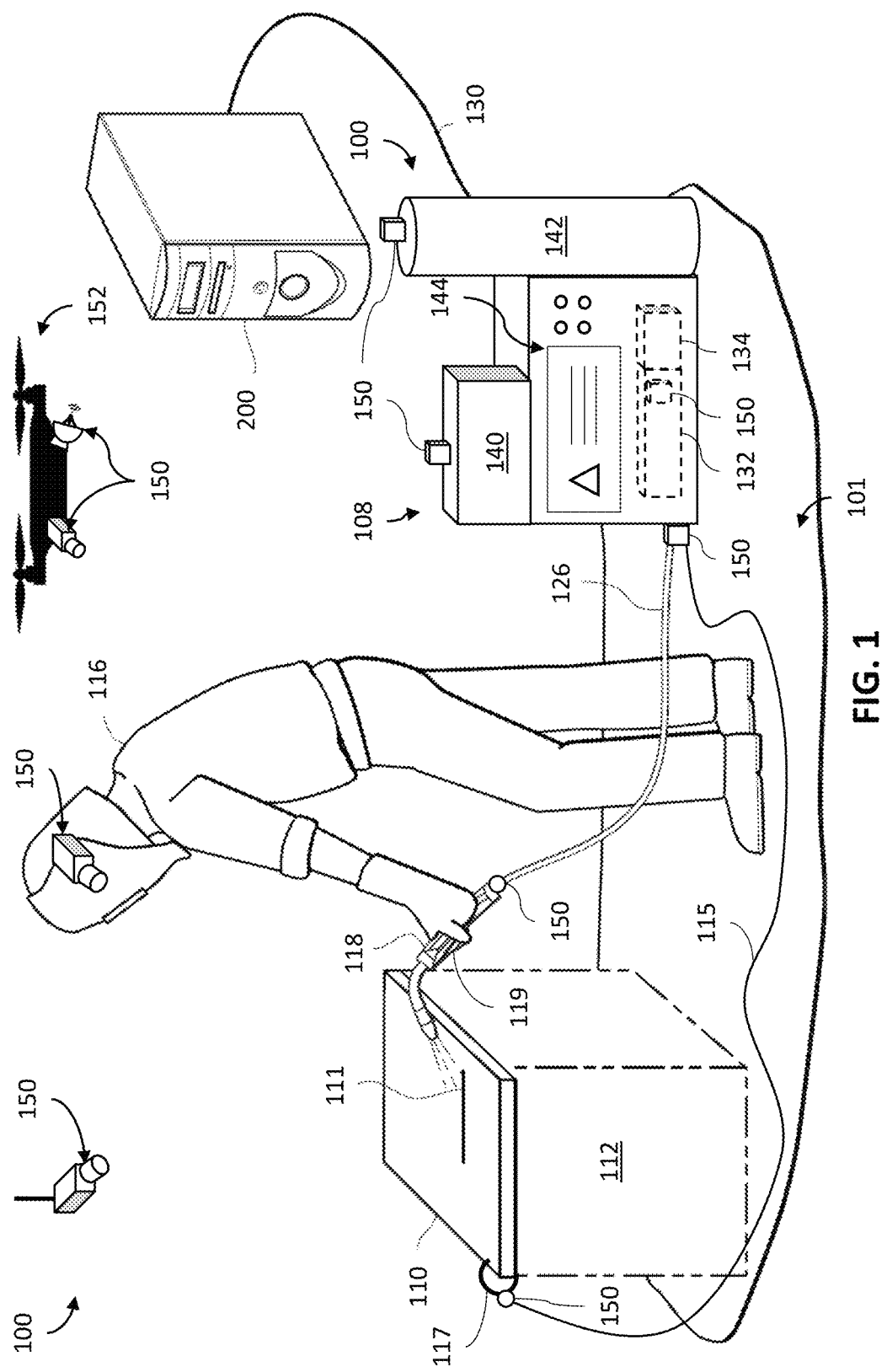
FIG. 1 shows a welding system in communication with a local monitoring station, in accordance with aspects of this disclosure.

The figures are not necessarily to scale. Where appropriate, the same or similar reference numerals are used in the figures to refer to similar or identical elements. For example, reference numerals utilizing lettering (e.g., welding cell 101a, welding cell 101b) refer to instances of the same reference numeral that does not have the lettering (e.g., welding cells 101).

DETAILED DESCRIPTION

Some examples of the present disclosure relate to weld monitoring systems configured to label non-welding time periods using machine learning techniques. Weld monitoring systems sometimes employ various sensors to monitor welding parameters of welding systems during welding. However, conventional weld monitoring systems rely on operators to tell the monitoring system what is happening when there is no welding. Unfortunately, operators often become preoccupied or forgetful, and neglect to describe what is happening when there is no welding.

The present disclosure therefore discusses weld monitoring systems that use machine learning techniques to try and understand the activities taking place when there is no welding. This enables the weld monitoring system to continue its monitoring even if the operator neglects to tell the system what is happening. In some examples, the weld monitoring systems may use various machine learning models to identify patterns that might indicate one or more activities are taking place when there is no welding. In some examples, the machine learning models may be continuously trained, updated, and/or improved using feedback from operators and/or other individuals, data from ongoing welding and/or non-welding activities, as well as data from other weld monitoring systems and/or machine learning models.

Some examples of the present disclosure relate to a welding system, comprising a weld monitoring system configured to capture one or more feature characteristics of a welding related operation over a first time period via a user interface or one or more sensors; processing circuitry; and memory circuitry comprising one or more machine learning models and computer readable instructions which, when executed, cause the processing circuitry to: identify one or more unlabeled non-welding time periods based on the one or more feature characteristics, determine, using the one or more machine learning models, whether one or more labels are applicable to the one or more unlabeled non-welding time periods, based on the one or more feature characteristics, and in response to determining that a label of the one or more labels is applicable to an unlabeled non-welding time period of the one or more unlabeled non-welding time periods, associate the label with the unlabeled non-welding time period.

In some examples, the memory circuitry further comprises computer readable instructions which, when executed, cause the processing circuitry to: train the one or more machine learning models using the association between the label and the unlabeled non-welding time period, and training the one or more machine learning models using at least one feature characteristic associated with the unlabeled non-welding time period. In some examples, the memory circuitry further comprises computer readable instructions which, when executed, cause the processing circuitry to: train the one or more machine learning models using one or more other machine learning models being applied to one or more other welding related operations. In some examples, the memory circuitry further comprises computer readable instructions which, when executed, cause the processing circuitry to: determine a confidence level of the label. In some examples, associating the label with the unlabeled non-welding time period comprises: determining a first label applicable to the unlabeled non-welding activity time period, and a first confidence level for the first label, using a first machine learning model; determining a second label applicable to the unlabeled non-welding activity time period, and a second confidence level for the second label, using a second machine learning model; and associating the label with the unlabeled non-welding activity time period based on the first confidence level or the second confidence level, the label comprising the first label or the second label.

In some examples, the memory circuitry further comprises a break model comprising a model of one or more welding operator break patterns, and determining whether the one or more labels are applicable to the one or more unlabeled non-welding activity time periods further comprises: determining, using the break model, whether one or more break labels are applicable to the one or more unlabeled non-welding time periods, based on the one or more feature characteristics. In some examples, the one or more break labels comprise one or more of an early break period, a lunch break period, a late break period, a bathroom break period, a scheduled break period, or a shift change period. In some examples, the memory circuitry further comprises a regular activity model comprising a model of one or more regular activity patterns, and determining whether the one or more labels are applicable to the one or more unlabeled non-welding time periods further comprises: determining, using the regular activity model and a clustering analysis, whether one or more regular activity labels are applicable to the one or more unlabeled non-welding time periods, based on the one or more feature characteristics. In some examples, the clustering analysis forms a partition tree from the one or more unlabeled non-welding time periods.

In some examples, wherein determining whether the one or more labels are applicable to the one or more unlabeled non-welding time periods further comprises: determining, using the clustering analysis, whether an outlier time period of the one or more unlabeled non-welding time periods is so dissimilar from the other one or more unlabeled non-welding time periods or the one or more regular activity patterns that the outlier time period should be labeled as an anomaly. In some examples, the memory circuitry further comprises computer readable instructions which, when executed, cause the processing circuitry to: associate a criticality grading to the outlier time period based on a duration of the time period or a degree of dissimilarity. In some examples, the memory circuitry further comprises computer readable instructions which, when executed, cause the processing circuitry to: issuing an alert or inhibiting an operation in response to determining the outlier time period should be labeled as an anomaly and is associated with a high criticality grading.

In some examples, the one or more sensors comprise one or more of a current sensor, a voltage sensor, a resistance sensor, a wire feed speed sensor, a gas flow sensor, a clamping sensor, an NFC interrogator, an RFID interrogator, a Bluetooth interrogator, a barcode reader, a camera, an optical sensor, an infrared sensor, an acoustic sensor, a sound sensor, a microphone, a position sensor, a global positioning system, an accelerometer, an inertial measurement unit, an x-ray sensor, a radiographic sensor, a torque sensor, a non-destructive testing sensor, a temperature sensor, or a humidity sensor. In some examples, the one or more feature characteristics comprise one or more operational features, activity specific features, activity labels, pre-activity features, or post-activity features. In some examples, the one or more operational features comprise one or more of a shift start time, a shift end time, a unique operator identifier, an operator name, an operator qualification, a filler material property, material preparation information, a material type, a gas type, an operation location, an ambient temperature, or an ambient humidity. In some examples, the one or more activity specific features comprise one or more of an activity start time, an activity end time, a previous activity, a previous event, a subsequent activity, a subsequent event, an image of the welding-related operation, or an image of an operational environment. In some examples, the one or more pre or post activity features comprise a pre or post activity start time, a pre or post activity end time, a pre or post activity duration, a number of completed welds, an arc time, a number of parts completed, a downtime duration, an operational time, an operation location, an ambient temperature, or an ambient humidity. In some examples, all of the one or more unlabeled non-welding time periods are within the time period. In some examples, at least one of the one or more unlabeled non-welding time periods is outside the time period.

Some of the example of the present disclosure relate to a method of automatically labeling non-welding time periods of a welding related operation, comprising: capturing one or more feature characteristics of the welding related operation over a time period via a user interface or one or more sensors; identifying, via processing circuitry, one or more unlabeled non-welding time periods based on the one or more feature characteristics; determining, using one or more machine learning models stored in memory circuitry, whether one or more labels are applicable to the one or more unlabeled non-welding time periods based on the one or more feature characteristics; and associating a label of the one or more labels with an unlabeled non-welding time period of the one or more unlabeled non-welding time periods in response to determining that the label is applicable to the unlabeled non-welding time period.

FIG. 1 shows an example welding system 100 and local monitoring station 200. As shown, the welding system 100 includes a welding torch 118 and work clamp 117 coupled to a welding-type power supply 108 within a welding cell 101. As shown, the local monitoring station 200 is electrically coupled to (and/or in electrical communication with) the welding-type power supply 108. In some examples, the local monitoring station 200 may also be in communication with the welding torch 118 (e.g., via the welding-type power supply 108).

In the example of FIG. 1, an operator 116 is handling the welding torch 118 near a welding bench 112 within the welding cell 101. In some examples, the welding bench 112 may be and/or include a fixturing system configured to hold one or more workpiece(s) 110. In some examples the fixturing system may include one or more work clamps 117 (e.g., manual and/or pneumatic clamps). In some examples, the workpiece(s) 110 may be independent of a welding bench 112, such as, for example a freestanding element such as a structural steel element, pipeline, or bridge. While a human operator 116 is shown in FIG. 1, in some examples, the operator 116 may be (and/or control) a robot and/or automated welding machine.

In the example of FIG. 1, the welding torch 118 is coupled to the welding-type power supply 108 via a welding cable 126. The clamp 117 is also coupled to the welding-type power supply 108 via a clamp cable 115. The welding-type power supply 108 is, in turn, in communication with local monitoring station 200, such as via conduit 130. In some examples, the welding-type power supply 108 may alternatively, or additionally, include wireless communication capabilities (e.g., wireless communication circuitry), through which wireless communication may be established with local monitoring station 200.

In the example of FIG. 1, the welding torch 118 is a gun configured for gas metal arc welding (GMAW). In some examples, the welding torch 118 may comprise an electrode holder (i.e., stinger) configured for shielded metal arc welding (SMAW). In some examples, the welding torch 118 may comprise a torch and/or filler rod configured for gas tungsten arc welding (GTAW). In some examples, the welding torch 118 may comprise a gun configured for flux-cored arc welding (FCAW). In some examples, the welding torch 118 may additionally, or alternatively, comprise a filler rod. In the example of FIG. 1, the welding torch 118 includes a trigger 119. In some examples, the trigger 119 may be actuated by the operator 116 to activate a welding-type operation (e.g., arc).

In the example of FIG. 1, the welding-type power supply 108 includes (and/or is coupled to) a wire feeder 140. In some examples, the wire feeder 140 houses a wire spool that is used to provide the welding torch 118 with a wire electrode (e.g., solid wire, cored wire, coated wire). In some examples, the wire feeder 140 further includes motorized rollers configured to feed the wire electrode to the torch 118 (e.g., from the spool) and/or retract the wire electrode from the torch 118 (e.g., back to the spool).

In the example of FIG. 1, the welding-type power supply 108 also includes (and/or is coupled to) a gas supply 142. In some examples, the gas supply 142 supplies a shielding gas and/or shielding gas mixtures to the welding torch 118 (e.g., via cable 126). A shielding gas, as used herein, may refer to any gas (e.g., CO2, argon) or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

Figure 2:
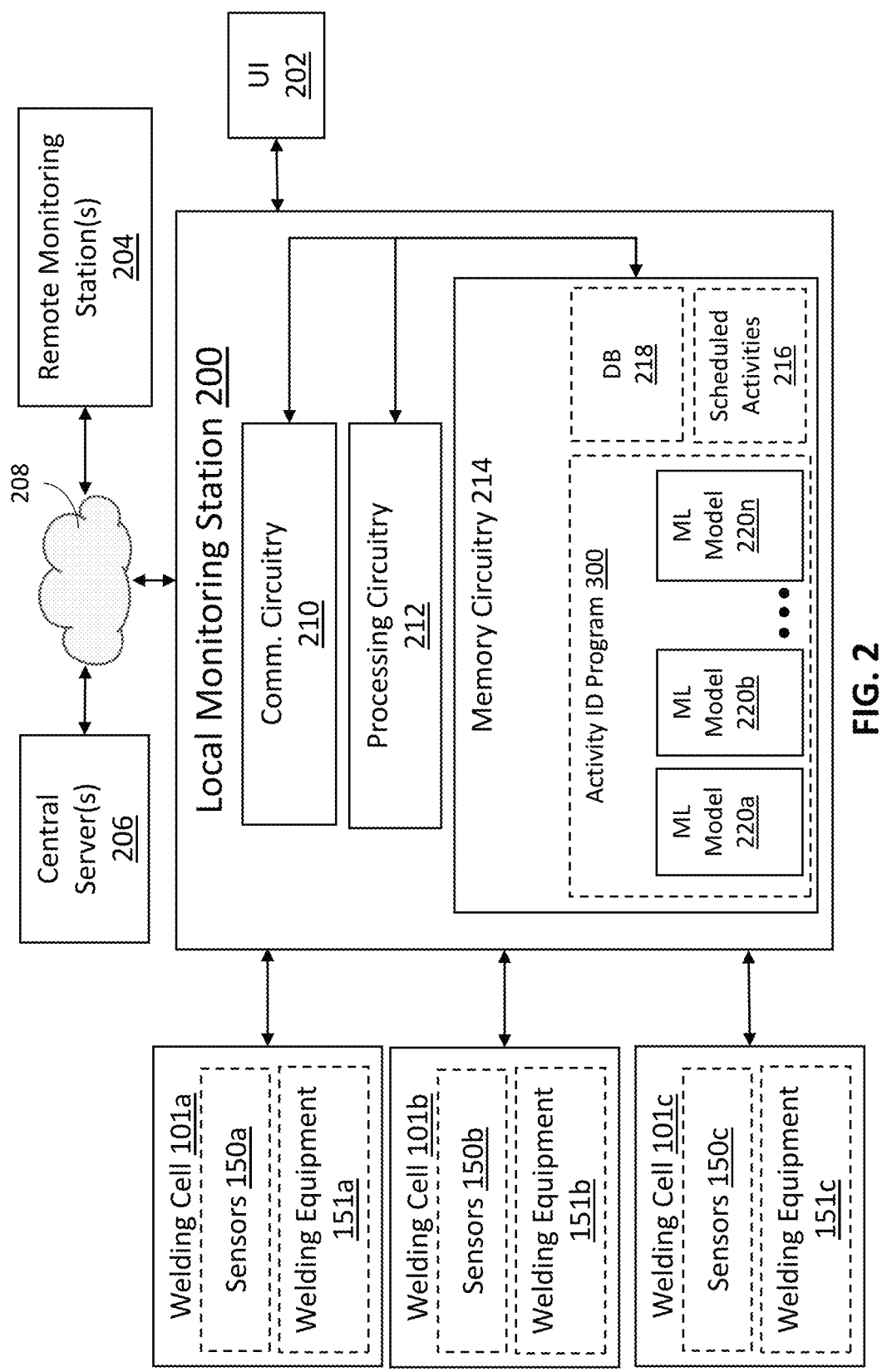
FIG. 2 is a block diagram showing further details of the local monitoring station of FIG. 1, in accordance with aspects of this disclosure.

In the example of FIGS. 1 and 2, the welding-type power supply 108 also includes an operator interface 144. In the example of FIG. 1, the operator interface 144 comprises one or more adjustable inputs (e.g., knobs, buttons, switches, keys, etc.) and/or outputs (e.g., display screens, lights, speakers, etc.) on the welding-type power supply 108. In some examples, the operator interface 144 may comprise a remote control and/or pendant. In some examples, the operator 116 (and/or other user) may use the operator interface 144 to enter and/or select one or more weld parameters (e.g., voltage, current, gas type, wire feed speed, workpiece material type, filler type, etc.) and/or weld operations for the welding-type power supply 108. In some examples, the operator interface 144 may further include one or more receptacles configured for connection to (and/or reception of) one or more external memory devices (e.g., floppy disks, compact discs, digital video disc, flash drive, etc.).

In the example of FIG. 1, the welding-type power supply 108 includes power conversion circuitry 132 configured to receive input power (e.g., from mains power, a generator, etc.) and convert the input power to welding-type output power. In some examples, the power conversion circuitry 132 may include circuit elements (e.g., transformers, rectifiers, capacitors, inductors, diodes, transistors, switches, and so forth) capable of converting the input power to output power. In some examples, the power conversion circuitry 132 may also include one or more controllable circuit elements. In some examples, the controllable circuit elements may comprise circuitry configured to change states (e.g., fire, turn on/off, close/open, etc.) based on one or more control signals. In some examples, the state(s) of the controllable circuit elements may impact the operation of the power conversion circuitry 132, and/or impact characteristics (e.g., current/voltage magnitude, frequency, waveform, etc.) of the output power provided by the power conversion circuitry 132. In some examples, the controllable circuit elements may comprise, for example, switches, relays, transistors, etc. In examples where the controllable circuit elements comprise transistors, the transistors may comprise any suitable transistors, such as, for example MOSFETs, JFETs, IGBTs, BJTs, etc.

As shown, the welding-type power supply 108 further includes control circuitry 134 electrically coupled to and configured to control the power conversion circuitry 132. In some examples, the control circuitry 134 may include processing circuitry (and/or one or more processors) as well as analog and/or digital memory. In some examples, the control circuitry 134 is configured to control the power conversion circuitry 132, so as to ensure the power conversion circuitry 132 generates the appropriate welding-type output power for carrying out the desired welding-type operation.

In some examples, the control circuitry 134 is also electrically coupled to and/or configured to control the wire feeder 140 and/or gas supply 142. In some examples, the control circuitry 134 may control the wire feeder 140 to output wire at a target speed and/or direction. For example, the control circuitry 134 may control the motor of the wire feeder 140 to feed the wire electrode to (and/or retract the wire electrode 250 from) the torch 118 at a target speed. In some examples, the welding-type power supply 108 may control the gas supply 142 to output a target type and/or amount gas. For example, the control circuitry 134 may control a valve in communication with the gas supply 142 to regulate the gas delivered to the welding torch 118.

In the example of FIG. 1, the welding system 100 further includes several sensors 150. In some examples, one or more of the sensors 150 may comprise one or more of a current sensor, a voltage sensor, a resistance sensor, a wire feed speed sensor, a gas flow sensor, a clamping sensor, an NFC interrogator, an RFID interrogator, a Bluetooth interrogator, a barcode reader, a camera, an optical sensor, an infrared sensor, an acoustic sensor, a sound sensor, a microphone, a position sensor, a global positioning system, an accelerometer, an inertial measurement unit, an x-ray sensor, a radiographic sensor, a torque sensor, a non-destructive testing sensor, a temperature sensor, and/or a humidity sensor. As shown, the sensors 150 are positioned in, on, and/or proximate to the work clamp 117, welding torch 118, welding-type power supply 108, wire feeder 140, gas supply 142, and power conversion circuitry 132.

In the example of FIG. 1, a sensor 150 is also shown mounted to and/or hanging from a fixture (e.g., wall, door, ceiling, pillar, curtain, etc.) of the welding cell 101. While only one sensor 150 is shown mounted to and/or hanging from a fixture, in some examples, multiple sensors 150 may be mounted to and/or hung from a fixture. As shown, multiple sensors 150 are also mounted to and/or hanging from an unattended robot vehicle 152 (e.g., a drone). While the robot vehicle 152 is an aerial vehicle in the example of FIG. 1, in some examples, the robot vehicle 152 may instead be a ground vehicle or an aquatic vehicle.

In some examples, the sensors 150 may be configured to sense, detect, and/or measure various welding data of the welding system 100. For example, the sensors 150 may sense, detect, and/or measure one or more locations, positions, and/or movements of the operator 116, welding torch 118, workpiece 110, and/or other objects within the welding cell 101. As another example, the sensors 150 may sense, detect, and/or measure air temperature, air quality, electromagnetism, and/or noise in the welding cell 101. As another example, the sensors 150 may sense, detect, and/or measure a voltage and/or current of the power received by the welding-type power supply 108, power conversion circuitry 132, and/or welding torch, and/or the voltage and/or current of the power output by the welding-type power supply 108 and/or power conversion circuitry 132. As another example, the sensors 150 may sense, detect, and/or measure a velocity (e.g., speed and/or feed direction) of the wire feeder 140 and/or type of wire being fed by the wire feeder 140. As another example, the sensors 150 may sense, detect, and/or measure a gas type and/or gas flow (e.g., through a valve) from the gas supply 142 to the welding torch 118. As another example, the sensors 150 may sense, detect, and/or measure a trigger signal (e.g., actuation, de-actuation, etc.) of the welding torch 118, and/or a clamping signal (e.g., clamp, unclamp, etc.) of the clamp 117.

In some examples, the sensors 150 may be configured to communicate data sensed, detected, and/or measured to the welding-type power supply 108 and/or local monitoring station 200. In some examples, the control circuitry 134 may be in communication with some or all of the sensors 150 and/or otherwise configured to receive information from the sensors 150. In some examples, data from the local monitoring station may be in communication with some or all of the sensors 150 and/or otherwise configured to receive information from the sensors 150.

In some examples, a welding operation (and/or welding process) may be initiated when the operator 116 actuates the trigger 119 of the welding torch 118 (and/or otherwise activates the welding torch 118). During the welding operation, the welding-type power provided by the welding-type power supply 108 may be applied to the electrode (e.g., wire electrode) of the welding torch 118 in order to produce a welding arc between the electrode and the one or more workpieces 110. The heat of the arc may melt portions of a filler material (e.g., wire) and/or workpiece 110, thereby creating a molten weld pool. Movement of the welding torch 118 (e.g., by the operator) may move the weld pool, creating one or more welds 111.

When the welding operation is finished, the operator 116 may release the trigger 119 (and/or otherwise deactivate/de-actuate the welding torch 118). In some examples, the control circuitry 134 may detect that the welding operation has finished. For example, the control circuitry 134 may detect a trigger release signal via sensor 150. As another example, the control circuitry 134 may receive a torch deactivation command via the operator interface 144 (e.g., where the torch 118 is maneuvered by a robot and/or automated welding machine).

In some examples, the sensors 150 may detect certain welding data pertaining to the welding-type power supply 108, clamp 117, bench 112, and/or welding torch 118 during a welding process. In some examples, the welding-type power supply 108 may also detect certain welding data (e.g., entered via the operator interface 144, detected by control circuitry 134, etc.) In some examples, the sensors 150 and/or welding-type power supply 108 may be configured to communicate this welding data to the local monitoring station 200 (directly and/or through welding-type power supply 108). In some examples, the welding data may be communicated to the local monitoring station 200 in real time, periodically during a welding operation, and/or after a welding operation.

FIG. 2 is a block diagram showing example components and connections of the local monitoring station 200. In the example of FIG. 2, the example local monitoring station 200 is electrically (and/or communicatively) coupled to the sensors 150 and/or welding equipment 151 (e.g. power supplies 108, torches 118, etc.) of several example welding cells 101. While three welding cells 101 are shown in the example of FIG. 2, in some examples, there may be more or less welding cells 101. In some examples, the local monitoring station 200 may receive data from each welding cell 101 continuously and/or periodically.

In the example of FIG. 2, the local monitoring station 200 is electrically (and/or communicatively) coupled to a user interface (UI) 202. In some examples, the UI 202 may comprise one or more input devices (e.g., touch screens, mice, keyboards, buttons, knobs, microphones, dials, etc.) and/or output devices (e.g., display screens, speakers, lights, etc.). In some examples, the UI 202 may further include one or more receptacles configured for connection to (and/or reception of) one or more external memory devices (e.g., floppy disks, compact discs, digital video disc, flash drive, etc.). In operation, an operator 116 or other user may provide input to, and/or receive output from, the local monitoring station 200 via the UI 202. While shown as a separate component in the example of FIG. 2, in some examples, the UI 202 may be part of the local monitoring station 200.

In the example of FIG. 2, the local monitoring station 200 is in communication with one or more remote monitoring stations 204 and one or more central servers 206 through a network 208 (e.g., the Internet, a wide access network, local access network, etc.). In some examples, the local monitoring station 200 may be in communication with the one or more remote monitoring stations 204 and/or the one or more central servers 206 directly, rather than through the network 208. In some examples, the central server(s) 206 may be implemented via the local monitoring station 200 and/or one or more of the remote monitoring stations 204. In some examples, one or more of the remote monitoring station(s) 204 may be local monitoring stations 200 that are remotely located.

In the example of FIG. 2, the local monitoring station 200 includes communication circuitry 210, processing circuitry 212, and memory circuitry 214, interconnected with one another via a common electrical bus. In some examples, the processing circuitry 212 may comprise one or more processors. In some examples, the communication circuitry 210 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 210 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.). In some examples, the local monitoring station 200 may be implemented by way of a desktop computer or local server computer.

In the example of FIG. 2, the memory circuitry 214 stores an activity identification program 300, certain scheduled non-welding activities 216, and a database 218, further discussed below. While shown as part of the local monitoring station 200 in the example of FIG. 2, in some examples, all or some of the activity identification program 300 may be stored in memory circuitry of the central server(s) 206, and/or executed by processing circuitry of the central server(s) 206. While shown as part of the local monitoring station 200 in the example of FIG. 2, in some examples, some or all of the database 218 may be stored in memory circuitry of the central server(s) 206 and/or one or more remote monitoring stations 204. In some examples, the database 218 may actually comprise multiple databases.

In some examples, the activity identification program 300 may analyze data collected by the sensors 150 and/or welding equipment 151 of each welding cell 101, as well as data collected via the UI 202 (e.g., operator information). In some examples, the activity identification program 300 may determine certain feature characteristics based on the analysis of the data. The feature characteristics may be used to define time periods of welding activity and/or non-welding activity. In some examples, the feature characteristics may also include one or more activity labels to ascribe to one or more non-welding time periods.

In some examples, the scheduled non-welding activities 216 may be used to associate activity labels to some or all of the non-welding time periods that have yet to be labeled. In some examples, the scheduled non-welding activities 216 may comprise one or more non-welding activities that may occur over one or more time periods in a given day, week, month, etc. For example, the scheduled non-welding activities 216 may include one or more non-welding activities planned for a particular operator 116, welding equipment 151, welding cell 101, work site, and/or welding job, as well as the date(s)/time(s) when the one or more activities are anticipated to occur. For example, the scheduled non-welding activities 216 may comprise data representative of one or more scheduled shift start, shift end, maintenance, breakfast, lunch, dinner and/or break periods for operators 116 working with particular welding equipment 151, in a particular weld cell 101, at a particular work site, and/or on a particular welding job. In some examples, the scheduled non-welding activities 216 may be entered via the UI 202, communicated from the remote monitoring station(s) 204, central server(s) 206, and/or other device, and/or programmatically determined.

In the example of FIG. 2, the activity identification program 300 comprises several machine learning models 220. While shown as part of the activity identification program 300 in the example of FIG. 2, in some examples, the machine learning models 220 may be separate from the activity identification program 300. In some examples, one or more of the machine learning models 220 may be used to determine one or more activity labels to ascribe to the non-welding time periods that remain unlabeled after considering the scheduled non-welding activities 216. In some examples, one or more of the machine learning models 220 may be used to further analyze the feature characteristics to determine the one or more activity labels. In some examples, one or more of the machine learning models 220 may be correlated with one or more welding cells 101, welding equipment 151, operators 116, work sites, and/or welding jobs.

In some examples, the one or more machine learning models 220 may be continually trained and/or updated using data from other machine learning models 220 that are correlated with other welding cells 101, welding equipment 151, operators 116, work sites, and/or welding jobs. In some examples, the one or more machine learning models 220 of the local monitoring station 200 may be continually trained and/or updated using data from other machine learning models 220 from other remote monitoring stations 204. In some examples, the one or more machine learning models 220 of the local monitoring station 200 may be continually trained and/or updated using the scheduled non-welding activities 216 from the local monitoring station 200 and/or other remote monitoring stations 204.

Figure 3A:
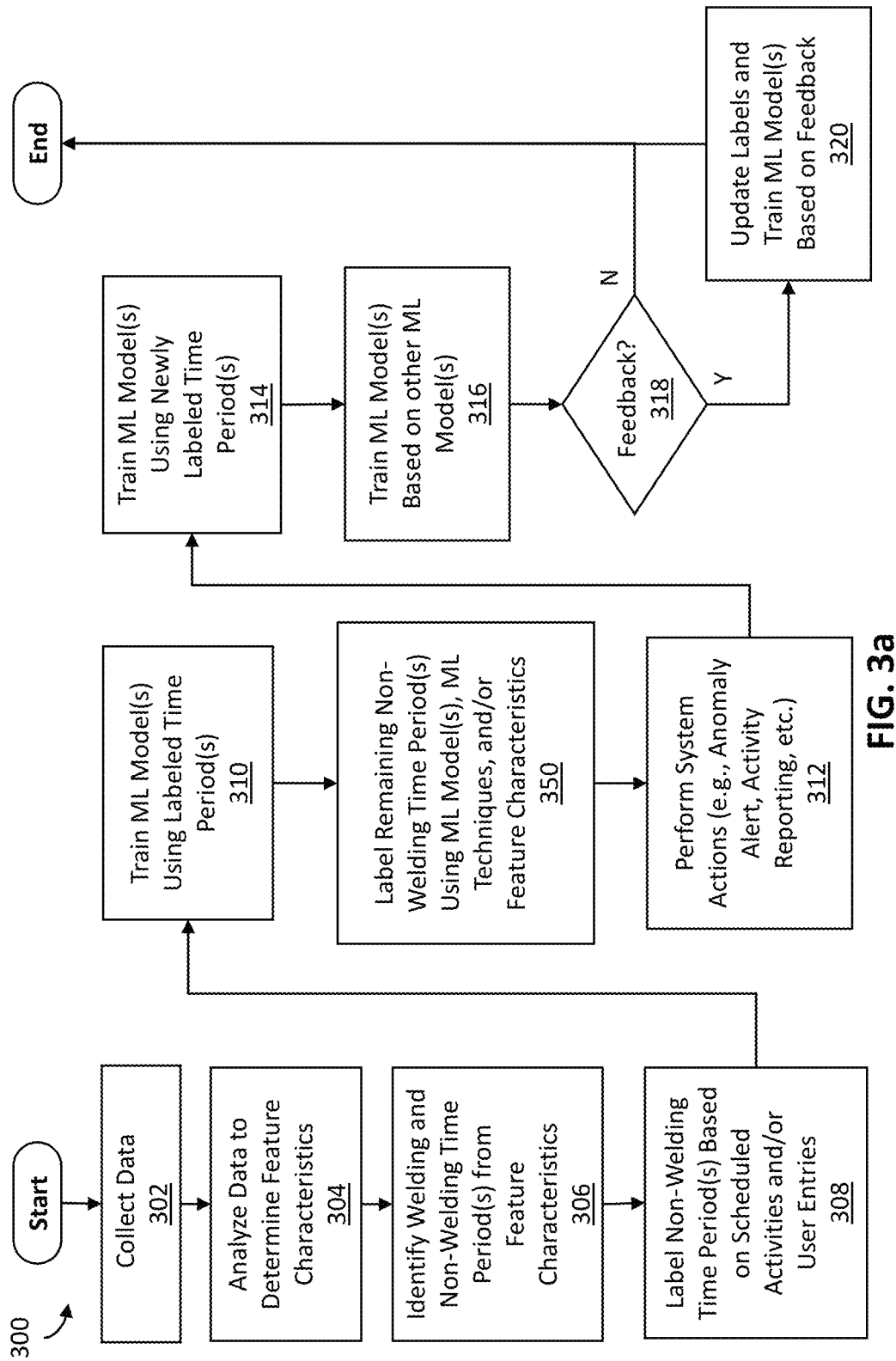
FIGS. 3a-3b are flow diagrams illustrating an example activity identification program, in accordance with aspects of this disclosure.
Figure 3B:
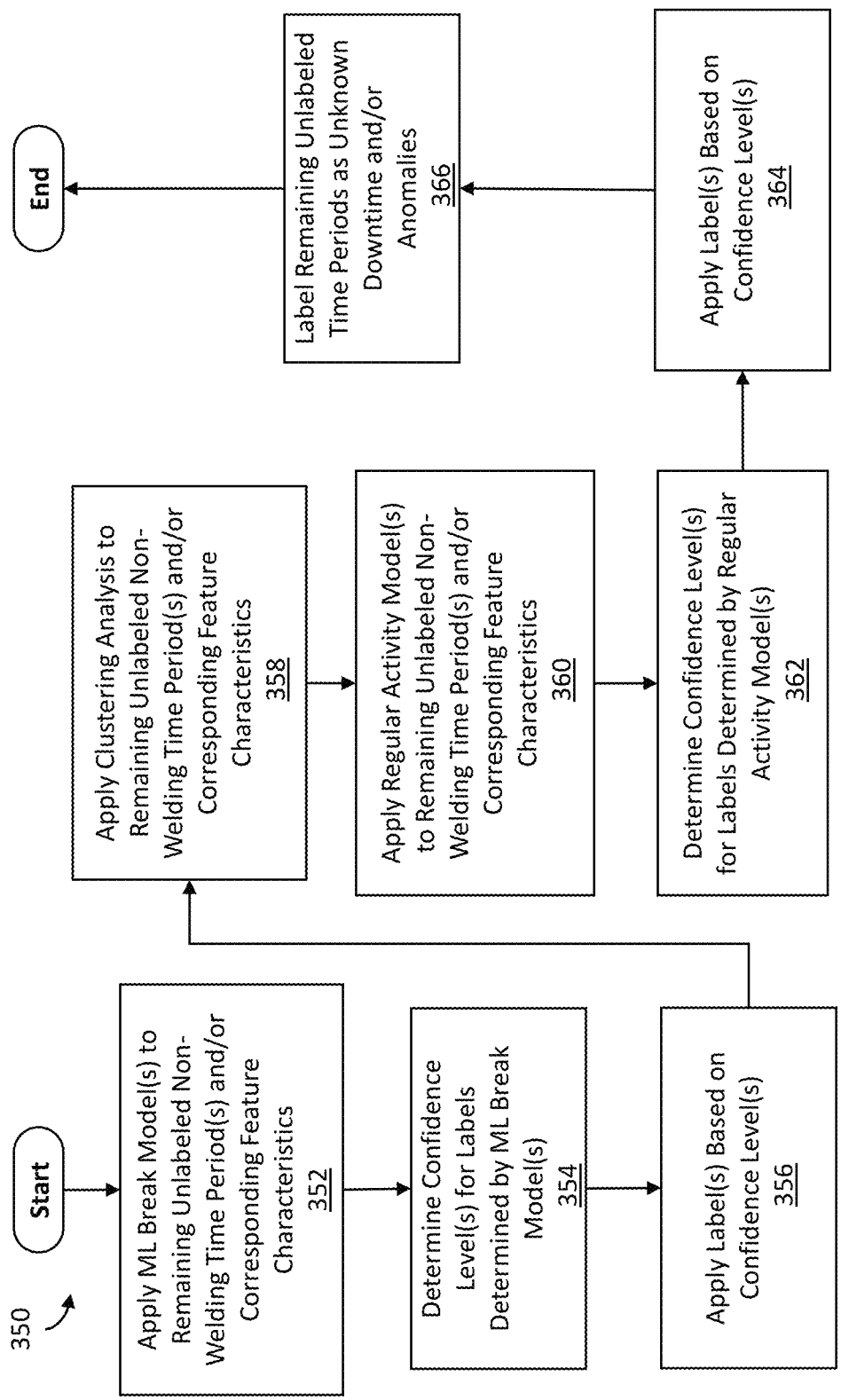

FIGS. 3a-3b are flowcharts illustrating an example activity identification program 300. In some examples, the activity identification program 300 may be implemented in machine readable (and/or processor executable) instructions stored in memory circuitry 214 and/or executed by the processing circuitry 212. While, in the description below, the activity identification program 300 is described with respect to a single welding cell 101, in some examples, multiple instances of the activity identification program 300 may be executed simultaneously (e.g., one for each welding cell 101).

In the example of FIG. 3a, the activity identification program 300 begins at block 302. At block 302, the sensors 150 and/or welding equipment 151 for the welding cell 101 collect data and communicate the data to the local monitoring station 200. In some examples, data may also be collected and/or communicated by the UI 202. In some examples, this data collecting may occur continuously and/or periodically. In some examples, the collected data may be stored in the database 218. While shown in the example of FIG. 3a for the sake of understanding, in some examples, this collecting and/or communication of data may happen outside of the context of the activity identification program 300.

In the example of FIG. 3a, the activity identification program 300 proceeds to block 304 after block 302. At block 304, the activity identification program 300 analyzes the data collected by the sensors 150, welding equipment 151, and/or UI 202 at block 302 to determine one or more feature characteristics. For example, the activity identification program 300 may determine when an arc welding operation starts, and/or the duration of the arc welding operation, based on one or more trigger signals, voltage data, current data, wire feed data, and/or gas supply data detected and/or measured by the sensors 150. As another example, the activity identification program 300 may determine a gas type and/or wire material type based on data detected and/or measured by the sensors 150, and/or data entered by an operator 116 via the operator interface 144 and/or UI 202. As yet another example, the activity identification program 300 may determine information pertaining to the operator 116 based on credentials supplied by the operator 116 via the operator interface 144 and/or UI 202, and/or based on operator data detected by the sensors 150.

In some examples, the one or more feature characteristics may comprise one or more operational features, activity specific features, activity labels, pre-activity features, and/or post-activity features. In some examples, operational features may include one or more of a shift start time, a shift end time, a unique operator identifier, an operator name, an operator qualification, a filler material property, material preparation information, a material type, a gas type, an operation location, an ambient temperature, an ambient humidity, an operation type, or a job type. In some examples, the activity specific features may include one or more of an activity start time, an activity end time, a previous activity, a previous event, a subsequent activity, a subsequent event, an image of the welding-related operation, and/or an image of an operational environment. In some examples, the pre and/or post activity features may comprise a pre and/or post activity start time, a pre and/or post activity end time, a pre and/or post activity duration, a number of completed welds, an arc time, a number of parts completed, a downtime duration, an operational time, an operation location, an ambient temperature, and/or an ambient humidity. In some examples, the activity identification program 300 may store the feature characteristics in the database 218.

In the example of FIG. 3a, the activity identification program 300 proceeds to block 306 after block 304. At block 306, the activity identification program 300 identifies one or more welding time periods 402 and/or non-welding time periods 404 based on the feature characteristics determined at block 304. For example, the activity identification program 300 may determine feature characteristics related to the start, end, and/or duration of arc welding operations at block 304, and these feature characteristics may be used to determine the one or more welding time periods and/or non-welding time periods. In some examples, the one or more welding time periods and/or non-welding time periods may be identified based on feature characteristics pertaining to one or more earlier, later, and/or overlapping time periods. In some examples, the activity identification program 300 may store the time periods in the database 218. In some examples, the activity identification program 300 may associate a welding activity label with the one or more welding time periods 402, and/or store the corresponding association(s) in the database 218.

FIGS. 4a-4d show an example twenty four hour time period 400 for an example welding cell 101 to help illustrate the activity identification program 300. In the example of FIG. 4a, the time period 400 has been divided up into several welding time periods 402 and non-welding time periods 404 by block 306 of the activity identification program 300. In the example of FIG. 4a, all the non-welding time periods 404 are unlabeled and all of the welding time periods 402 are labeled (e.g., as normal welding activity).

In the example of FIG. 3a, the activity identification program 300 proceeds to block 308 after block 306. At block 308, the activity identification program 300 assigns and/or associates one or more labels with one or more of the identified non-welding time periods based on the scheduled non-welding activities 216 and/or one or more user entries. For example, the scheduled non-welding activities 216 may label one or more of the identified non-welding time periods as being due to a scheduled non-welding activity (e.g., shift change, maintenance operation, etc.). As another example, a user may manually label one or more of the identified non-welding time periods as being due to some other non-welding activity (e.g., bathroom break, resupply, meeting, etc.). In some examples, the manually entered label(s) may be considered part of the data gathered at block 302 and/or feature characteristics determined at block 304. In some examples, the activity identification program 300 may associate the non-welding label(s) with the appropriate non-welding time period(s) 404, and/or store the corresponding association(s) in the database 218.

In the example of FIG. 4b, the non-welding time period 404a, non-welding time period 404c, and non-welding time period 404e have been labeled by block 308 of the activity identification program 300. For example, the non-welding time period 404a and non-welding time period 404b may have been labeled as end of shift activities at block 308 based on the scheduled non-welding activities 216. As another example, the non-welding time period 404c may have been manually labeled as a lunch break activity by the operator 116 (e.g., via the UI 202) at block 302 or 304 of the activity identification program 300. As shown, the non-welding time period 404a has also been shortened in duration, and a new non-welding time period 404f has been identified in the remaining time. This may occur, for example, because the scheduled non-welding activities 216 indicates that the end of shift activity was scheduled to end at 9 a.m. Thus, the activity identification program 300 now needs to try and understand what was occurring after 9 a.m., during the non-welding time period 404f. In the example of FIG. 4b, non-welding time period 404b, non-welding time period 404d, and non-welding time period 404f remain unlabeled.

In the example of FIG. 3a, the activity identification program 300 proceeds to block 310 after block 308. At block 310, the activity identification program 300 trains one or more of the machine learning models 220 using the labeled non-welding time period(s) 404 of block 308. In some examples, the activity identification program 300 may also use the gathered data and/or feature characteristics associated with the labeled non-welding time period(s) (and/or one or more preceding and/or successive time periods) to train the machine learning model(s) 220. In this way, the machine learning model(s) 220 may learn to recognize non-welding time periods 404 that have similar characteristics in the future and automatically associate the correct label(s). While shown directly after block 308 in the example of FIG. 3a, in some examples, block 310 may take place more towards the end of the activity identification program 300.

In the example of FIG. 3a, the activity identification program 300 proceeds to block 350 after block 310. At block 350, the activity identification program 300 uses one or more machine learning models 220 and/or one or more (e.g., unsupervised) machine learning techniques to try and label the remaining unlabeled non-welding time period(s) 404. In some examples, multiple machine learning models 220 may be used. In some examples, the machine learning model(s) 220 used may depend on the welding cell 101, welding equipment 151, operator 116, and/or other factors. In some examples, the activity identification program 300 may associate any successfully determined label(s) with the appropriate non-welding time period(s) 404, and/or store the corresponding association(s) in the database 218. Block 350 is discussed in more detail below with respect to FIG. 3b.

In the example of FIG. 3a, the activity identification program 300 proceeds to block 312 after block 350. At block 312, the activity identification program 300 performs one or more system actions. In some examples, system actions may include alerts, notifications, communications, and/or inhibitions. For example, the activity identification program 300 may alert a user (e.g., via the UI 202) that the activity identification program 300 has identified one or more unusual non-welding time periods that warrant closer attention. As another example, the activity identification program 300 might send and/or output some communication(s) (e.g., to a supervisor) stating that one or more time periods have been associated with a flagged label. As another example, the activity identification program 300 may determine that one or more required non-welding time periods 404 did not occur prior to and/or after welding (e.g., for pre-heating and/or polishing). In response, the activity identification program 300 may send one or more signals to one or more pieces of welding equipment 151 representative of a command to disable the welding equipment 151 and/or inhibit one or more functions of the welding equipment 151.

In the example of FIG. 3a, the activity identification program 300 proceeds to block 314 after block 312. At block 314 one or more of the machine learning models 220 are updated and/or trained based on the labels applied to the non-welding time periods 404 at block 350, and/or the associated gathered data and/or feature characteristics. After block 314, the activity identification program 300 proceeds to block 316, where one or more of the machine learning models 220 are updated and/or trained based on other machine learning models 220, and/or the labels applied to non-welding time periods by the other machine learning models 220 (and/or the associated gathered data and/or feature characteristics). For example, the machine learning model(s) 220 used for one welding cell 101a may learn to recognize and/or label non-welding time periods 404 with certain feature characteristics. The machine learning model(s) 220 used for a different welding cell 101b may be trained to perform the same recognition and/or labeling using the data from the machine learning model(s) 220 used for the welding cell 101a. In some examples, the other machine learning models 220 and/or associated data may be of the local monitoring station 200 and/or one or more remote monitoring station 204.

In the example of FIG. 3a, the activity identification program 300 proceeds to block 318 after block 316. At block 318, the activity identification program 300 determines whether there is any applicable manually entered feedback. In some examples, manually entered feedback may comprise one or more inputs (e.g., entered via UI 202) correcting or confirming a label and/or time period. For example, the activity identification program 300 may label one or more non-welding time periods 404 as pertaining to a category A non-welding activity. Thereafter, a user may manually indicate (e.g., via UI 202) that what the activity identification program 300 has labeled category A (for lack of better label) can more precisely labeled as a cleanup activity. As another example, a user may manually indicate (e.g., via UI 202) that what the activity identification program 300 has labeled an anomaly is actually a bathroom break, and/or that what the activity identification program 300 has labeled a maintenance activity is correctly labeled as a maintenance activity. As yet another example, a user may manually indicate (e.g., via UI 202) that a time period the activity identification program 300 identified as being one large unlabeled non-welding time period is actually several smaller non-welding time periods 404 lumped together.

In the example of FIG. 3a, if there is no manual feedback to consider, the activity identification program 300 ends. However, if there is manual feedback to consider, the activity identification program 300 proceeds to block 320 where the database 218 is updated based on the feedback, and/or one or more machine learning model(s) are updated and/or trained based on the feedback. Thus, as time goes on, the machine learning model(s) 220 may be continuously updated and/or improved based on applied labels, other models, and/or feedback from users, thereby becoming ever more accurate and/or comprehensive.

FIG. 3b is a flowchart further illustrating the machine learning block 350 of the activity identification program 300 of FIG. 3a. As shown, the machine learning block 350 begins at block 352 where the activity identification program 300 applies one or more break models (e.g., of the machine learning models 220) to the one or more remaining unlabeled non-welding time periods 404 (and/or the feature characteristics pertaining to that time period and/or one or more preceding and/or following time periods). In some examples, the break model(s) may model break patterns observed to occur with respect to certain operators 116. In some examples, there may be several different break models, each with their own different patterns.

In some examples, the activity identification program 300 may be configured to recognize feature characteristics that fit the pattern(s) of the break model(s). For example, a break model for a given welding operator 116 may model observed break patterns for that operator 116. One of those break patterns may be an observed pattern of the operator 116 taking a bathroom break for twenty minutes most mornings (e.g., after morning coffee). As another example, a break model for newer welding operators 116 may model an observed pattern of newer operators 116 to spend a half hour in the morning and/or afternoon reviewing training and/or instructional materials before beginning to weld. In some examples, the activity identification program 300 may analyze the feature characteristics pertaining to the one or more remaining unlabeled non-welding time periods and determine whether they fit any of the patterns of the break model(s). If the activity identification program 300 determines that feature characteristics related to a non-welding time period 404 fit the model pattern(s) (e.g., similar time, similar operator or operator type), the activity identification program 300 may label the non-welding time period 404 accordingly. In some examples, the activity identification program 300 may preliminarily associate one or more labels with the non-welding time period(s) 404 that appears to fit the model pattern(s).

In the example of FIG. 3b, the activity identification program 300 proceeds to block 354 after block 352. At block 354, the activity identification program 300 determines one or more confidence levels for the one or more preliminary label associations determined at block 352. This confidence level may be used to resolve conflicts, such as, for example, where two or more different break models associate two or more different labels to the same unlabeled non-welding time period.

In the example of FIG. 3b, the activity identification program 300 proceeds to block 356 after block 354. At block 356, the activity identification program 300 resolves any labeling conflicts based on the various confidence levels determined at block 354. For example, where two or more different break models associate two or more different labels to the same unlabeled non-welding time period, the activity identification program 300 may choose the label associated with the highest confidence level. In some examples, blocks 354 and/or 356 may be skipped, such as where only one break model is applied at block 352, and/or where there are no conflicts.

FIG. 4c illustrates a non-welding time period 404b that has been labeled by blocks 352-356 of the activity identification program 300. For example, the activity identification program 300 may recognize the non-welding time period 404b (and/or related feature characteristics) as matching one or more coffee break patterns of the break model(s), and label the non-welding time period 404b a coffee break activity. As shown, non-welding time period 404d and non-welding time period 404f remain unlabeled.

In the example of FIG. 3b, the activity identification program 300 proceeds to block 358 after block 356. At block 358, the activity identification program 300 performs a clustering analysis on the one or more remaining unlabeled non-welding time periods 404 (and/or the feature characteristics pertaining to that time period and/or one or more preceding and/or following time periods). In some examples, the clustering analysis may be performed on one or more labeled and/or unlabeled non-welding time periods 404 (and/or related feature characteristics).

In some examples, the clustering analysis may generate a partition tree that groups together (and/or clusters) one or more time periods into one or more partitions. In some examples, the partition tree may comprise a hierarchy of partitions. In some examples, the activity identification program 300 may use the partition tree and/or one or more partitions to assign one or more labels to the remaining unlabeled non-welding time periods. For example, where a remaining unlabeled non-welding time period is clustered in a partition with one or more similarly (or identically) labeled non-welding time periods (e.g., based on similar feature characteristics), the activity identification program 300 may associate the same (or a similar) label with the unlabeled non-welding time period.

In the example of FIG. 3*b*, the activity identification program 300 proceeds to block 360 after block 358. At block 360, the activity identification program 300 applies one or more regular activity models (e.g., of the machine learning models 220) to the one or more remaining unlabeled non-welding time periods (and/or the feature characteristics pertaining thereto). In some examples, the regular activity model(s) may model regular non-welding activities observed to occur with respect to certain welding cells 101, welding operations, welding locations, etc. For example, a regular activity model for a welding cell 101 in Alaska may model an observed pattern of prolonged pre-heating before welding (e.g., to warm and/or soften up a workpiece in the cold Alaskan environment). In some examples, there may be several different break models, each with their own different patterns (e.g., based on welding cells 101, welding operations, welding locations, etc).

In some examples, the activity identification program 300 may analyze the feature characteristics pertaining to the one or more remaining unlabeled non-welding time periods and determine whether they fit any of the patterns of the regular activity model(s). To the extent that they do, one or more labels may be preliminarily associated with the time period(s) that appears to warrant the label(s) based on the patterns of the regular activity model(s). The preliminary associations may remain preliminary until confidence levels for each label can be evaluated.

In the example of FIG. 3*b*, the activity identification program 300 proceeds to block 362 after block 360. At block 362, the activity identification program 300 determines one or more confidence levels for one or more preliminary label associations determined at block 360. This confidence level may be used to resolve conflicts, such as, for example, where two or more different regular activity models associate two or more different labels to the same unlabeled non-welding time period.

In the example of FIG. 3*b*, the activity identification program 300 proceeds to block 364 after block 362. At block 364, the activity identification program 300 resolves any labeling conflicts based on the various confidence levels determined at block 362. For example, where two or more different regular activity models associate two or more different labels to the same unlabeled non-welding time period, the activity identification program 300 may choose the label associated with the highest confidence level. In some examples, blocks 362 and/or 364 may be skipped, such as where only one regular activity model is applied at block 360, and/or where there are no conflicts.

In the example of FIG. 4*d*, the non-welding time period 404*f* has been labeled by blocks 360-364 of the activity identification program 300. For example, the activity identification program 300 may recognize the non-welding time period 404*f* (and/or associated feature characteristics) as matching one or more pre-heating patterns of the regular activity model(s), and label the non-welding time period 404*b* a pre-heating activity. As shown, non-welding time period 404*d* remains unlabeled.

In the example of FIG. 3*b*, the activity identification program 300 proceeds to block 366 after block 364. At block 366, the activity identification program 300 labels each of the remaining unlabeled non-welding time periods as an unknown downtime activity, anomaly activity, and/or outlier time period. In some examples, the activity identification program 300 may associate a criticality grading or rating to each unknown downtime activity, anomaly activity, and/or outlier time period. In some examples, the criticality grading may be based on a duration and/or degree of dissimilarity of the unknown downtime activity, anomaly activity, and/or outlier time period. For example, the activity identification program 300 may associate a low criticality grading with an unknown downtime non-welding time period that is relatively short in duration (e.g., 20 minutes) and/or at least somewhat similar to one or more other labeled time periods (e.g., closer than some threshold distance in the partition tree). On the other hand, the activity identification program 300 may associate a high criticality grading with an unknown downtime non-welding time period that is relatively long in duration (e.g., 3 hours) and/or very dissimilar to one or more other labeled time periods (e.g., farther than some threshold distance in the partition tree).

In the example of FIG. 4*d*, the non-welding time period 404*d* remains unlabeled, but is also of relatively short duration. Thus, in the example, of FIG. 4*d*, the activity identification program 300 may label the non-welding time period 404*d* as an unknown downtime activity, anomaly activity, and/or outlier time period. However, since the non-welding time period 404*d* is relatively short in duration, the activity identification program 300 may associate a low criticality grading.

In the example of FIGS. 3*a* and 3*b*, the activity identification program 300 returns to block 312 after block 366. At block 312, the activity identification program 300 may perform one or more system actions, as discussed above. In some examples, the activity identification program 300 may perform one or more high priority system actions (e.g., activate one or more alerts, notifications, communications, and/or inhibitions) at block 312 in response to an unknown downtime activity, anomaly activity, and/or outlier time period with a high criticality grading. In some examples, the activity identification program 300 may perform a low priority system action (e.g., simply set a review flag) response to an unknown downtime activity, anomaly activity, and/or outlier time period with a low criticality grading.

The present disclosure contemplates using machine learning techniques to try and understand non-welding activities taking place when an operator 116 neglects to tell the system what is happening. In some examples, the weld monitoring systems may use various machine learning models and/or techniques to identify data patterns that suggest one or more similar and/or identical non-welding activities. In some examples, the machine learning models may be continuously trained, updated, and/or improved using feedback from operators and/or other individuals, data from ongoing welding and/or non-welding activities, as well as data from other weld monitoring systems and/or machine learning models.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A welding system, comprising:
   a weld monitoring system configured to capture one or more feature characteristics of a welding related operation over a first time period via a user interface or one or more sensors;
   processing circuitry; and
   memory circuitry comprising one or more machine learning models and computer readable instructions which, when executed, cause the processing circuitry to:
     identify one or more unlabeled non-welding time periods based on the one or more feature characteristics,
     determine, using the one or more machine learning models, whether one or more labels are applicable to the one or more unlabeled non-welding time periods, based on the one or more feature characteristics, and
     in response to determining that a label of the one or more labels is applicable to an unlabeled non-welding time period of the one or more unlabeled non-welding time periods, associate the label with the unlabeled non-welding time period.

2. The system of claim 1, wherein the memory circuitry further comprises computer readable instructions which, when executed, cause the processing circuitry to: train the one or more machine learning models using the association between the label and the unlabeled non-welding time period, as well as at least one feature characteristic associated with the unlabeled non-welding time period.

3. The system of claim 1, wherein the memory circuitry further comprises computer readable instructions which, when executed, cause the processing circuitry to: train the one or more machine learning models using one or more other machine learning models being applied to one or more other welding related operations.

4. The system of claim 1, wherein the memory circuitry further comprises computer readable instructions which, when executed, cause the processing circuitry to: determine a confidence level of the label.

5. The system of claim 1, wherein associating the label with the unlabeled non-welding time period comprises:
   determining a first label applicable to the unlabeled non-welding activity time period, and a first confidence level for the first label, using a first machine learning model;
   determining a second label applicable to the unlabeled non-welding activity time period, and a second confidence level for the second label, using a second machine learning model; and
   associating the label with the unlabeled non-welding activity time period based on the first confidence level or the second confidence level, the label comprising the first label or the second label.

6. The system of claim 1, wherein the memory circuitry further comprises a break model comprising a model of one or more welding operator break patterns, and determining whether the one or more labels are applicable to the one or more unlabeled non-welding activity time periods further comprises:
   determining, using the break model, whether one or more break labels are applicable to the one or more unlabeled non-welding time periods, based on the one or more feature characteristics.

7. The system of claim 6, wherein the one or more break labels comprise one or more of an early break period, a lunch break period, a late break period, a bathroom break period, a scheduled break period, or a shift change period.

8. The system of claim 1, wherein the memory circuitry further comprises a regular activity model comprising a model of one or more regular activity patterns, and determining whether the one or more labels are applicable to the one or more unlabeled non-welding time periods further comprises:
   determining, using the regular activity model and a clustering analysis, whether one or more regular activity labels are applicable to the one or more unlabeled non-welding time periods, based on the one or more feature characteristics.

9. The system of claim 8, wherein the clustering analysis forms a partition tree from the one or more unlabeled non-welding time periods.

10. The system of claim 8, wherein determining whether the one or more labels are applicable to the one or more unlabeled non-welding time periods further comprises:
    determining, using the clustering analysis, whether an outlier time period of the one or more unlabeled non-welding time periods is so dissimilar from the other one or more unlabeled non-welding time periods or the one or more regular activity patterns that the outlier time period should be labeled as an anomaly.

11. The system of claim 10, wherein the memory circuitry further comprises computer readable instructions which, when executed, cause the processing circuitry to: associate a criticality grading to the outlier time period based on a duration of the time period or a degree of dissimilarity.

12. The system of claim 11, wherein the memory circuitry further comprises computer readable instructions which, when executed, cause the processing circuitry to: issue an alert or inhibit an operation in response to determining the outlier time period should be labeled as an anomaly and is associated with a high criticality grading.

13. The system of claim 1, wherein the one or more sensors comprise one or more of a current sensor, a voltage sensor, a resistance sensor, a wire feed speed sensor, a gas flow sensor, a clamping sensor, an NFC interrogator, an RFID interrogator, a Bluetooth interrogator, a barcode reader, a camera, an optical sensor, an infrared sensor, an acoustic sensor, a sound sensor, a microphone, a position sensor, a global positioning system, an accelerometer, an inertial measurement unit, an x-ray sensor, a radiographic sensor, a torque sensor, a non-destructive testing sensor, a temperature sensor, or a humidity sensor.

14. The system of claim 1, wherein the one or more feature characteristics comprise one or more operational features, activity specific features, activity labels, pre-activity features, or post-activity features.

15. The system of claim 14, wherein the one or more operational features comprise one or more of a shift start time, a shift end time, a unique operator identifier, an operator name, an operator qualification, a filler material property, material preparation information, a material type, a gas type, an operation location, an ambient temperature, or an ambient humidity.

16. The system of claim 14, wherein the one or more activity specific features comprise one or more of an activity start time, an activity end time, a previous activity, a previous event, a subsequent activity, a subsequent event, an image of the welding-related operation, or an image of an operational environment.

17. The system of claim 14, wherein the one or more pre or post activity features comprise a pre or post activity start time, a pre or post activity end time, a pre or post activity duration, a number of completed welds, an arc time, a number of parts completed, a downtime duration, an operational time, an operation location, an ambient temperature, or an ambient humidity.

18. The system of claim 1, wherein all of the one or more unlabeled non-welding time periods are within the first time period.

19. The system of claim 1, wherein at least one of the one or more unlabeled non-welding time periods is outside the first time period.

20. A method of automatically labeling non-welding time periods of a welding related operation, comprising:

capturing one or more feature characteristics of the welding related operation over a time period via a user interface or one or more sensors;

identifying, via processing circuitry, one or more unlabeled non-welding time periods based on the one or more feature characteristics;

determining, using one or more machine learning models stored in memory circuitry, whether one or more labels are applicable to the one or more unlabeled non-welding time periods based on the one or more feature characteristics; and associating a label of the one or more labels with an unlabeled non-welding time period of the one or more unlabeled non-welding time periods in response to determining that the label is applicable to the unlabeled non-welding time period.

* * * * *